Figure 1:
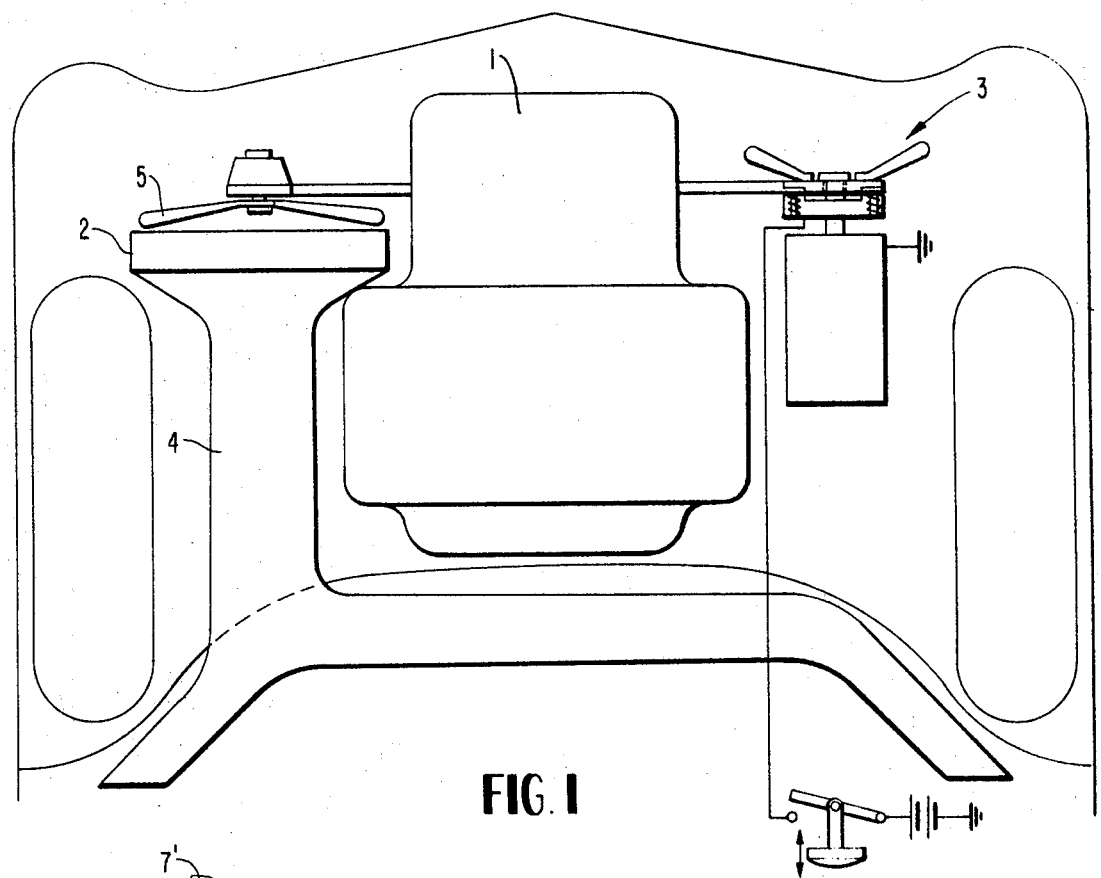

United States Patent

[11] 3,583,630

| [72] | Inventors | Karl Wilfert<br>Gerlingen-Waldstadt;<br>Rudolf Andres, Sindelfingen, both of,<br>Germany |
|---|---|---|
| [22] | Filed | Sept. 18, 1968 |
| [45] | Patented | June 8, 1971 |
| [73] | Assignee | Daimler-Benz Aktiengesellschaft<br>Stuttgart-Unterturkheim, Germany |
| [32] | Priority | Sept. 19, 1967 |
| [33] | | Germany |
| [31] | | 54150 and 1630353 |

[54] HEATING AND VENTILATING INSTALLATION FOR MOTOR VEHICLES
4 Claims, 2 Drawing Figs.

| [52] | U.S. Cl. | 237/8,<br>237/12.3 |
|---|---|---|
| [51] | Int. Cl. | B60h 1/06 |
| [50] | Field of Search | 237/12.3<br>WA; 98/2.4 |

[56] References Cited
UNITED STATES PATENTS

| 2,729,158 | 1/1956 | Wilfert | 237/12.3WX |
|---|---|---|---|
| 3,170,632 | 2/1965 | Gallie | 98/2-4X |
| 2,009,823 | 7/1935 | Van Vulpen | 237/5 |
| 2,101,627 | 12/1937 | Nallinger | 123/174 |
| 2,814,448 | 11/1957 | Schutt | 237/8 |
| 3,026,042 | 3/1962 | Zoltok | 237/12.3W |

FOREIGN PATENTS

| 829,324 | 3/1938 | France | 237/12.3W |
|---|---|---|---|
| 1,034,340 | 4/1953 | France | 237/12.3W |

Primary Examiner—Edward J. Michael
Attorney—Craig, Antonelli, Stewart & Hill

ABSTRACT: A heating and ventilating installation for motor vehicles with liquid-cooled engines, in particular with rotary piston internal combustion engines which is characterized in that the engine radiator is arranged laterally of the engine and serves as heater for the air supplied to the passenger space.

PATENTED JUN 8 1971

3,583,630

INVENTORS
KARL WILFERT
RUDOLF ANDRES

BY Craig & Antonelli

ATTORNEYS

HEATING AND VENTILATING INSTALLATION FOR MOTOR VEHICLES

The present invention relates to a heating and ventilating installation for motor vehicles with liquid-cooled engines, especially with rotary piston engines.

With the heating and ventilating installations for motor vehicles known heretofore in the prior art, separate heating apparatus or heat-exchangers were used for heating the motor vehicle interior space.

The present invention aims at creating an effective heating and ventilating installation with structural means that are as simple as possible. The present invention essentially consists in that the engine radiator is arranged laterally of the engine and serves as heating apparatus for the air supplied to the passenger space. In particular, with rotary piston engines in which different space conditions prevail within the engine space, this construction is extraordinarily advantageous because a separate heat-exchanger for the heating system of the passenger space and the corresponding connecting accessories and fittings can be dispensed with.

Appropriately, an air channel may be provided terminating in the passenger space which branches off from the air outlet channel and is adapted to be closed thereat by means of a flap or valve adapted to pivot far into the air outlet channel. The supplied heat can be metered by opening and adjusting the flap. Provision is made advantageously that the engine radiator is arranged as close as possible to the passenger space. Heat losses, especially heat radiations, are kept small thereby. In order to be able to supply additional fresh air to the heated air, a preferably steplessly adjustable fresh air flap or valve may be mounted laterally at the air channels. Provision is also made advantageously that a preferably adjustable blower is arranged in the air channel downstream of the valve or flap closing the air channel and of the fresh air flap or valve.

According to a further feature of the present invention, a louver or shutter actuatable in dependence on the temperature of the engine may be provided at the end of the air outlet channel. This shutter corresponds in its function to the known radiator thermostat.

In order to enable a fresh air ventilation dependent on the driving velocity, i.e., on the dynamic air pressure, a further fresh air valve or flap may be provided downstream of the blower or fan. This fresh air valve or flap is intended for the ventilation during the summer and entails the advantage that, for example, in city traffic while standing in front of traffic lights or with substantially stationary long lines of motor vehicles, no exhaust gases of the immediately preceding vehicle, i.e. of the vehicle standing in front, can be sucked into the passenger space.

Accordingly, it is an object of the present invention to provide a heating and ventilating installation for motor vehicles, especially for motor vehicles equipped with rotary piston internal combustion engines, which avoids by extremely simple and effective means the aforementioned shortcomings encountered in the prior art.

Another object of the present invention resides in a heating and ventilating installation for motor vehicles which greatly reduces the number of separate parts required therefor and thereby considerably reduces the overall cost.

A further object of the present invention resides in a heating and ventilating installation for motor vehicles which assures effective heating and ventilation of the vehicle under all climatic conditions and with structural means that are as simple as possible.

Still a further object of the present invention resides in a heating and ventilation system for motor vehicles which minimizes heat losses, particularly due to radiation, facilitates assembly and offers great versatility in actual operation under different traffic conditions.

Figure 2:
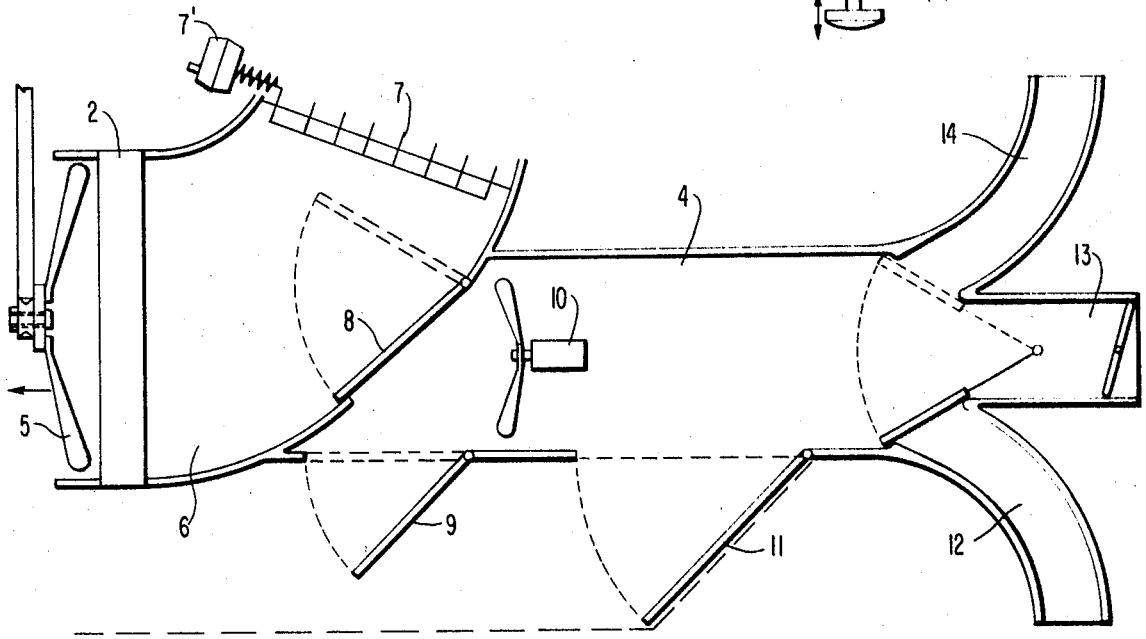

These and further objects, features, and advantages of the present invention will become more obvious from the following description when taken in connection with the accompanying drawing, which shows, for purposes of illustration only, one embodiment in accordance with the present invention, and wherein:

FIG. 1 is a schematic plan view on an engine space of a motor vehicle with a rotary piston internal combustion engine in accordance with the present invention; and FIG. 2 is a schematic view of one embodiment of a heating and ventilating installation for a motor vehicle in accordance with the present invention.

Referring now to the drawing wherein like reference numerals are used throughout the two views to designate like parts, and more particularly to FIG. 1, space conditions result in the engine space of motor vehicles, especially by the use of rotary piston internal combustion engines, as are illustrated in this figure. These space conditions permit in a simple manner to accommodate an engine radiator 2 on one side of the engine 1 and possibly a condenser generally designated by reference numeral 3 of a cooling compressor on the other side of the engine 1. The engine radiator 2 is connected with the passenger space by way of an air channel or conduit 4. On the one hand, a separate heating apparatus or additional heat-exchanger is thereby economized and, on the other, a warming-up or heating-up of the passenger space takes place within a few minutes with a rotating engine by reason of the constant flow of the cooling water through the radiator which is maintained with the help of the water pump of the engine. A fan 5 is arranged in the usual manner in front of the engine radiator 2 as shown in FIG. 2. An air outlet channel 6 adjoins the engine radiator 2. A shutter or louver 7 of any conventional construction is arranged in the air outlet channel 6 which corresponds in its function to the usual radiator thermostat and is controlled, i.e., selectively opened and closed by a heat-sensitive means 7' of conventional construction and sensing the temperature conditions of the engine. The air channel 4 which terminates in the passenger space, starts at this air outlet channel 6. The air channel 4 is adapted to be closed with respect to the air outlet channel 6 of the engine radiator 2 by means of a valve or flap 8 of conventional construction. A fresh air valve or flap 9 is arranged laterally at the air channel 4. A fan or blower 10 is arranged within the air channel 4 downstream of the valve or flap 8 leading to the air outlet channel 6 and downstream of the fresh air valve or flap 9; the fan 10 is constructed as a rule as radial blower, preferably as an adjustable radial blower. A further fresh air valve or flap 11 is provided also laterally at the air channel 4 downstream of the blower 10. Prior to the discharge into the passenger space, the air channel 4 branches off into individual channel sections 12, 13 and 14 which are adapted to be selectively opened and closed in any conventional, known manner depending on where the fresh air or heated air is to be conducted.

During the winter operation, the shutter 7 at the end of the air outlet channel 6 is closed for the most part whereas the steplessly adjustable air flap or valve 8 is opened corresponding to the heat requirement in the passenger space. It is frequently desirable if, in addition to the heated air, a certain proportion of fresh air is supplied at the same time to the passenger space. For that purpose, the steplessly adjustable fresh air valve 9 can then be opened so that the blower 10 sucks in both heated air as well as fresh air and blows the same into the passenger space. By reason of the closed shutter or louver 7 and the large air flap 8, a large quantity of heated air can be removed. If the air channel 4 is kept smaller in cross section than the air outlet channel 6, which is the case in the illustrated embodiment, then the air flows with a lower velocity through the engine radiator 2 than subsequently through the air channel 4 whereby a good heat-exchange takes place and a very strong heating of the air is realized.

During summer operation, the air valve 8 is closed and the louver or shutter 7 is opened. A ventilation of the passenger space, independent of the dynamic air pressure, is possible by means of the blower 10 and the first fresh air valve 9. However, it is frequently favorable if a ventilation of the passenger space, dependent on the dynamic air pressure, is provided, especially when to the extent possible, no exhaust gases are to be sucked into the passenger space from the vehicle in front, for example, in case of long lines of standing automobiles. A further fresh air flap or valve 11 is provided downstream of the blower 10 for the fresh air ventilation dependent on the dynamic air pressure which is also adjustable in a stepless manner by conventional means.

While we have shown and described only one embodiment in accordance with the present invention, it is understood that the same is not limited thereto, but is susceptible of numerous changes and modifications as shown to a person skilled in the art, and we therefore do not wish to be limited to the details shown and described herein but intend to cover all such changes and modifications as are within the scope of those skilled in the art.

We claim:

1. An automotive vehicle, particularly a passenger car having a liquid-cooled rotary piston front engine and a temperature control unit for the engine and the interior of the passenger compartment of the vehicle, said temperature control unit comprising engine radiator means, disposed laterally of the engine for cooling said engine and for heating the interior of the vehicle, having an exhaust duct connected thereto, a ventilation duct connected to said exhaust duct by a closable air mixing channel branching off said exhaust duct and connected to said passenger compartment by closable mixing conduits for providing a direct airflow communication path between said radiator and said passenger compartment, said air mixing channel being provided with a pair of fresh air intakes and a blower disposed between the intakes of said pair of fresh air intakes and being downstream of said exhaust duct, each of said intakes being selectively closable by a steplessly adjustable flap.

2. An automotive vehicle according to claim 1 further comprising shutter means in said exhaust duct, and means for actuating said shutter means in dependence on the engine temperature.

3. An automotive vehicle according to claim 1, wherein said closable air mixing channel is connected to said exhaust duct by valve means for selectively adjusting the amount of air flowing from said radiator means through said ventilation duct.

4. An automotive vehicle according to claim 3, wherein said ventilation duct includes air outlet channel means for exhausting air heated by said engine radiator means.